May 5, 1959
D. LABINO
2,885,299
METHOD OF STOPPING LEAKS IN WATER SYSTEMS USING A COMPOSITION
COMPRISING GLASS FIBERS AND A PHENOL OR
MELAMINE FORMALDEHYDE RESIN
Filed Dec. 30, 1954
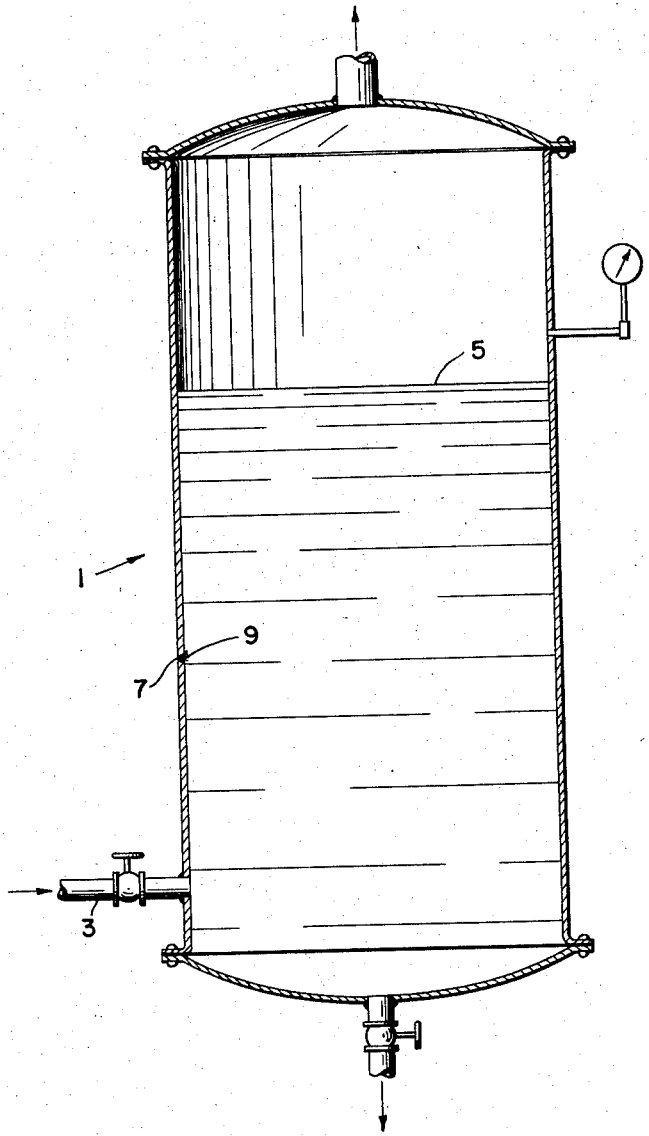
INVENTOR.
DOMINICK LABINO
BY
ATTORNEYS

United States Patent Office 2,885,299
Patented May 5, 1959

2,885,299

METHOD OF STOPPING LEAKS IN WATER SYSTEMS USING A COMPOSITION COMPRISING GLASS FIBERS AND A PHENOL OR MELAMINE FORMALDEHYDE RESIN

Dominick Labino, Toledo, Ohio, assignor, by mesne assignments, to L.O.F. Glass Fibers Company, Toledo, Ohio, a corporation of Ohio Application December 30, 1954, Serial No. 478,753

1 Claim. (Cl. 117—2)

My present invention relates to a composition for the stopping of boiler leaks and particularly is directed to the provision of a composition for the stoppage of leaks in low pressure domestic water systems.

I have found that an excellent composition for the blocking of a leak in a boiler for example, may be comprised of bonded fine fibers, particularly siliceous fibers.

More specifically I have found that very fine siliceous fibers, that is, fibers less than one micron in diameter, usually termed micro-fibers, may be readily dispersed in water but when the same are passed through a very small opening they tend to adhere together; if a bonding agent is provided in the water to coat the fibers very lightly the coherency of the fibers will be improved and leaks otherwise difficult to stop up will be completely closed, the action being substantially instantaneous.

The invention will be more fully understood by reference to the following detailed description and single figure of the drawing which illustrates the application of the compound of invention to a hot water boiler to plug a leak in the same.

Referring to the drawing there is illustrated by the numeral 1 a hot water boiler such as is customarily employed in home heating systems. Boiler 1 has at the bottom thereof a fill connection indicated at 3 and the level of the water is indicated at 5 as being above the fill connection. The water is drained to about level 5 in the practice of the invention before adding the stop-leak compound. The leak in the present instance is indicated at 7 and the fibers as they are packing into the opening are indicated at 9.

Most suitably the composition of invention includes two sizes of siliceous fiber of differing characteristics, a large quantity of water, a small concentration of a water soluble resin and an addition agent to improve the water tolerance of the composition.

Preferably each of the fibers employed is attained in a known manner by drawing glass filaments from a source of molten glass and then attenuating the filaments to very short length, small diameter fibers in a hot gaseous blast. In this manner fibers well below one micron in diameter are attainable and I have found it most beneficial to employ fiber sizes which are in this range. Such fibers are both adsorbent and absorbent. Thus one of the fiber sizes may be constituted of blown glass fibers of about 0.2 to 0.3 micron in diameter and of a length of less than about 1/32 of an inch and generally the length is as low as 1/128 of an inch.

The blown fibers may also be leached free of constituents other than $SiO_2$ to provide a quartz fiber; such is commercially available and I prefer to employ for the second of the fiber sizes $SiO_2$ fiber having a diameter of about 0.4 to 0.5 micron which fiber generally is of a length of between about 1/128 inch to 1/32 inch.

These very small diameter, short length fibers disperse readily in water; the $SiO_2$ fiber has a higher heat resistance than the usual glass fiber, but the glass fiber has a somewhat greater tendency to disperse readily and accordingly it is beneficial to employ some of each in the composition. The $SiO_2$ fiber is somewhat more expensive however and it is therefore desirable to employ the glass fiber in the larger quantity generally.

The most suitable resins are the water soluble phenol formaldehydes and melamine formaldehydes. Both wet the fibers and tend to increase bond strength when the fibers coalesce at the leak to be plugged.

As the addition agent I prefer a small quantity of ammonia as this constituent increases the water tolerance and tends to clear the aqueous composition to the extent that it appears as a clear solution.

In my preferred formulation I utilize, mixing well, 5 grams of micro-fiber, 0.3 micron diameter
3 grams of micro quartz fiber, 0.5 micron diameter
20 pounds of $H_2O$
4 ounces of water soluble phenol formaldehyde
Sufficient ammonia to provide a clear solution.

(The term micro-fiber is used to designate fiber of a diameter of one micron or less.)

The compound described above is placed in the boiler when the level is about 5 in the figure and the fibers wetted with the resin enter the opening defining the leak at 7 and completely plug the same. The quantity which is added to the boiler need only be small and any slight amount which enters the system will not affect system components such as valves.

In one specific test on a hot water boiler, using the above composition, I have succeeded in plugging a leak where other commercially available stop-leak compounds had completely failed. The material of my invention has been in service in this application in excess of 16 months without any sign of leakage and without any detrimental effect on this hot water system.

I attribute the high degree of utility of the composition to the ready dispersibility of the quartz fiber which may be utilized as the sole fiber of the composition. However, the quartz is more expensive than the micro-fiber and for this reason it is generally preferred to employ at least some of the micro-fiber to provide body in the composition when the same is in an opening or crack of a boiler.

It is to be further noted that in one instance I have successfully plugged, with the composition of invention, a crack 6 to 8 inches long in which a table knife could be inserted.

The composition of invention, both because of the short length and diameter of the fibers and because of the low fiber concentration in the water, appears as a clear solution although it is apparently a highly stable suspension approaching the colloidal.

The resinous bonding agent coats the fibers and assists in retaining the same together when the fibers pack into the opening defining the leak.

It will be understood that this invention is susceptible to modification in order to adapt it to different usages and conditions and accordingly, it is desired to comprehend such modifications within this invention as may fall within the scope of the appended claim.

I claim:

The method of stopping leaks in boilers and similar water system components containing water, which comprises adding to the water present in said boilers and similar water system components a stop-leak composition comprising an aqueous dispersion of glass fibers, said fibers being less than about 1 micron in diameter and less than about 1/32 inch in length, and a quantity of a water soluble resin sufficient to wet said fibers, said resin being chosen from the group consisting of water soluble phenol-formaldehyde and water soluble melamine-formaldehyde condensation products.

References Cited in the file of this patent

UNITED STATES PATENTS

| | | |
|---|---|---|
| 2,293,546 | Holmen | Aug. 18, 1942 |
| 2,315,321 | Evans et al. | Mar. 30, 1943 |
| 2,391,737 | Pabst | Dec. 25, 1945 |
| 2,626,213 | Novak | Jan. 20, 1953 |
| 2,681,894 | Hoenel | June 22, 1954 |
| 2,706,156 | Arledter | Apr. 12, 1955 |